United States Patent
Setsuda et al.

[15] 3,692,752
[45] Sept. 19, 1972

[54] ADHESIVE COMPOSITION CONTAINING α-CYANOACRYLATE AS ITS MAIN INGREDIENT

[72] Inventors: Kisuke Setsuda, Ichikawa-shi; Iwakichi Sugiyama, Narashino-shi, both of Japan

[73] Assignee: Matsumoto Seiyaku Kogyo Kabushiki Kaisha, Menamiyahata, Ichikawa-shi, Chiba-ken, Japan

[22] Filed: Oct. 29, 1969

[21] Appl. No.: 872,377

[30] Foreign Application Priority Data

Oct. 31, 1968  Japan ..................... 43/19425

[52] U.S. Cl. ............ 260/78.5 N, 117/132, 117/139, 260/30.6, 260/31.8, 260/89.5 S, 260/898, 260/DIG. 43
[51] Int. Cl. ............................................. C08f 15/16
[58] Field of Search ....... 260/78.5 N, 86.1 R, 86.1 N, 260/86.1 E, 85.5 A

[56] References Cited

UNITED STATES PATENTS

| | | |
|---|---|---|
| 2,437,231 | 3/1948 | Mowry .................. 260/78.5 N |
| 2,816,093 | 12/1957 | Coover ................. 260/78.5 N |
| 3,247,145 | 4/1966 | Masters et al ......... 260/78.5 N |
| 3,218,305 | 11/1965 | Krieble .................... 260/86.1 |

Primary Examiner—Harry Wong, Jr.
Attorney—Waters, Roditi, Schwartz & Nissen

[57] ABSTRACT

α-cyanoacrylate adhesive compositions each of which comprises a α-cyanoacrylic ester and a diacrylic ester compound or dimethacrylic ester compound which is added to the former ester and adhesives prepared from said composition having very excellent heat-resistance.

1 Claim, No Drawings

ADHESIVE COMPOSITION CONTAINING α-CYANOACRYLATE AS ITS MAIN INGREDIENT

BACKGROUND OF THE INVENTION

The present invention relates to adhesive compositions having improved heat-resistance, and more particularly to heat-resistant α-cyanoacrylate adhesive compositions. An α-cyanoacrylate adhesives is generally hardenable at room temperature, is of the one component liquid type, and has a high adhering speed, but has a disadvantage in that it is lacking in impact strength and peeling strength. For eliminating the disadvantage mentioned above, various methods have hitherto been proposed. For example, there are inventions such as U.S. Pat. No. 2,784,127 in which dioctyladipate and other plasticizers are used to improve the adhesive, U.S. Pat. No. 2,816,093 in which the property of the adhesive is improved by using nitro-cellulose, and U.S. Pat. No. 2,816,093 in which the property of the adhesive is improved by means of a polymerizable vinyl monomer. In practice, however, extremely strict requirements are necessary, so that in the case of using α-cyanoacrylate adhesive, it is usual to adopt a particular procedure for avoiding peeling load or to moderate any impact applied thereto by means of any impact-moderating material such as rubber. Furthermore, the α-cyanoacrylate adhesive is low in its heat-resistance. The adhesives mentioned above are mainly used in precision machines and electric parts, but in said machines and parts there are almost no portions which are exposed to temperatures of about 150° – 200° C from their operational point of view. However, during their operation, the temperature of some portions are sometimes elevated to about 120° C or more. On the other hand, the strength of the α-cyanoacrylate adhesives decrease suddenly as soon as the temperature of said adhesives exceeds 100° C. Accordingly, from a heat-resistance point of view, the commercial α-cyanoacrylate adhesives cannot be used in practice. In general, when any material is used, it is required that there is a temperature tolerance of about 10 – 20 percent above estimated maximum temperature during operation. Accordingly, in order to make the adhesives mentioned above usable for the precision machines and electric parts, a heat-resistance, that is, a strength of at least 50 kg/cm², preferably 100 kg/cm², at room temperature after heating at 150° C for one hour is considered to be necessary. Under such conditions as mentioned above, the strength of the commercial α-cyanoacrylate adhesives is of the order of 0 – 20 kg/cm². Since the heat-resistance mentioned above cannot be improved unless the composition itself constituting the adhesive is improved it has been proposed to vary the ester group or to add β-substituted-α-cyanoacrylate to α-cyanoacrylate in order to improve the adhesive. However, heretofore, there has been no success in obtaining an excellent adhesive.

In general, the α-cyanoacrylate polymer is subject, when it is heated at a certain temperature, to thermal decomposition accompanied by main chain splitting as in the case of methylmethacrylate, but the former polymer is softened at a temperature below said former certain temperature. Accordingly, heat-resistance above said softening temperature cannot be expected. Of course, the temperature range mentioned above is different depending upon polymerization degree, ester composition and the like, but since the strength of the commercial α-cyanoacrylate adhesives disappears at a temperature range from 140° C to 150° C, the softening temperature range of said adhesives may be considered to be the range of 140° – 150° C. In general, the softening temperature ranges of a high molecular compound can be elevated by introduction of a cross-linking structure into the adhesive composition or by increasing the intermolecular force. As a result of various studies relating to improvement of the heat-resistance of the α-cyanoacrylate adhesives, the inventors have found that said heat-resistance can be effectively improved by adding diacrylic ester compound or a dimethacrylic ester compound.

SUMMARY OF THE INVENTION

Therefore, it is an essential object of the present invention to provide α-cyanoacrylate adhesive compositions having greatly improved heat-resistance.

The above object and other objects of the invention have been attained by adding a diacrylic ester compound or dimethacrylic ester compound to α-cyanoacrylate adhesive compositions. The characteristic features and the method of producing the adhesive compositions according to the invention will become more apparent and more readily understandable from the following detailed description of the invention.

DETAILED DESCRIPTION OF THE INVENTION

As a result of studies relating to improvement of heat-resistance of the α-cyanoacrylate adhesives by using highly polymerizable compounds which are capable of producing a stable solution with αcyanoacrylate and are compatible with α-cyanoacrylate, the inventors have succeeded in improving the heat-resistance of the adhesives by adding at least one kind of the following compounds.

(1) polyether acrylates or polyether methacrylates of the following formula:

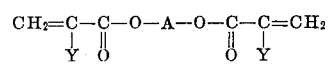

(where Y designates hydrogen, methyl, or halogen; A designates $-(C_nH_{2n}O)_m C_nH_{2n}-$, wherein n = 2, 3, 4 or 5. m is 0 or an integer between 1 and 14). For example, ethylene glycol diacrylate, ethylene glycol dimenthacrylate, diethylene glycol dimethacrylate, diethylene glycol dichloroacrylate, triethylene glycol dimethacrylate, tetraethylene glycol diacrylate, tetraethylene glycol dimethacrylate polyethylene glycol dimethacrylate, etc.

(2) Acrylic or methacrylic esters of bis (hydroxyalkyl) phosphonic acid derivatives of the following formula:

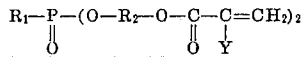

(wherein $R_1$ designates an aromatic hydrocarbon group such as $C_6H_5-$, $C_6H_4(CH_3)-$, an unsaturated hydrocarbon group such as $C_6H_5-CH=CH-$, $CH_2=CH_2-$, or a hydrocarbon group such as $C_6H_5CH_2-$, $C_4H_5-$; $R_2$ designates an unsubstituted or substituted hydrocarbon group of $C_2-C_8$, the substituent being halogen, fatty acid group such as

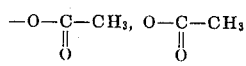

, or acrylate or methacrylate group such as

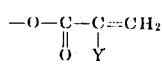

; Y has the same meaning as above). For example, bis (acryloxyethyl) phenylphosphate, bis (methacryloxyethyl)$\beta$- -phenylvinylphosphonate, bis (methacryloxyacetoxy glyceryl) benzylphosphate, bis (methacryloxychloropropyl) -phenylvinyl phosphonate, bis (dimethacryloxy glyceryl) - $\beta$phenylvinyl phosphonate, bis (diacryloxy glyceryl) -$\beta$-phenylvinyl phosphonate etc.

(3) Acrylic and methacrylic esters of trishydroxyalkyl cyanuric acid derivatives of the following formula:

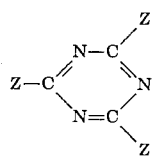

(wherein Z designates

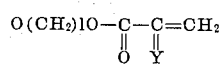

$l$=an integer above 2), or

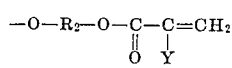

($R_2$ and Y have the same meaning as above). For example, tris (acryloxyethyl cyanurate, tris (methacryloxyethyl) cyanurate, tris (methacryloxyacetoxyglyceryl) cyanurate, tris (dimethacryloxyglceryl) cyanurate etc.

(4acrylic esters and methacrylic esters of polyols for example, trimethylol propane trimethacrylate, hexyleneglycol diacrylate. When one or more of the compounds mentioned above (1), (2), (3) and (4) are added in an amount of 0.5 – 20 percent by weight, preferably 1 – 10 percent, based on the $\alpha$-cyanoacrylate to $\alpha$-cyanoacrylate adhesives, a significantly improved heat-resistance is imparted to said adhesives. Further, plasticizer and viscosity adjusters such as polymethacrylate may also be used in order to adjust the viscosity of the adhesive composition. However, it is preferable to use the plasticizer in an amount of less than 10 percent because its excessive addition reduces the heat-resistance.

The adhesive composition according to the present invention is stable during a long period of time such as six months or more at room temperature as in the case of conventional $\alpha$-cyanoacrylate adhesives and can be used in the same condition as that of the latter adhesives. The setting time and adhesive strengths of the present compositions are similar to those of said conventional adhesives and the tensile shear strength of the present composition in the case of mild steel is 210 – 240 kg/cm² at room temperature. However, when the present composition is heated to above 100° C, its strength is considerably higher as compared with the conventional adhesives. For example, at room temperature after heating of the composition for one hour at 150° C, it has a strength of 60 – 135 kg/cm² in the case of mild steel. This means that the present composition has a high heat resistance which is several times that of conventional adhesives.

EXAMPLE 1

6.5 parts of bis (dimethacryloxy glyceryl) -$\beta$-phenylvinyl phosphonate and 0.5 part of polymethylmethacrylate solution are added to 93 parts of ethyl-$\alpha$-cyanoacrylate containing 0.001 part of sulfur dioxide and 0.06 part of hydroquinone as stabilizers, and the mixture thus obtained is dissolved homogeneously. A solution having a viscosity of 3 cps (at 26° C) is obtained.

The resulting product has a setting time of 60 – 120 sec. in the case of mild steel and of 30 – 60 sec. in the case of brass. The adhesive strength of said product is 235 kg/cm² in the case of mild steel. (This is the tensile shear strength at a tensioning rate of 250 mm/min, measured after curing of the adhesive temperature for 24 hours after adhesion thereof.) Further, the heat-resistance of this product is much higher than that of conventional adhesives as shown in a table set forth hereinafter.

EXAMPLE 2

Similarly as in the case of Example 1, 3 parts of bis (dimethacryloxyglyceryl)-$\beta$-phenylvinyl phosphate and 5 parts of diethylene glycol dimethacrylate are added to 12 parts of ethyl$\alpha$-cyanoacrylate, whereby a solution having a viscosity of 2cps is obtained. This resulting product has a setting time of 60 – 120 sec. in the case of mild steel and of 30 – 60 sec. in the case of brass. The adhesive strength of said product is 248 kg/cm² in the case of mild steel, and the heat-resistance of the product is excellent as shown in the later table.

EXAMPLE 3

Similarly as in the case of Example 1, 9 parts of tetraethylene glycol dimethacrylate and one part of polymethyl methacrylate solution are added to 60 parts of ethlyl-$\alpha$-cyanoacrylate containing 30 parts of methyl -$\alpha$-cyanoacrylate, and the mixture thus obtained is dissolved homogeneously, whereby a solution having a viscosity of 2cps is obtained.

The resulting product has a setting time of 60 – 90 sec. in the case of mild steel and of 30 – 45 sec. in the case of brass. The adhesive strength of the product is 248 kg/cm² in the case of mild steel, and the heat-resistance of the product is excellent as shown in the later table.

EXAMPLE 4

Similarly as in the case of Example 1, 7 parts of diethyleneglycol diacrylate and one part of polymethyl methacrylate solutions are added to 92 parts of ethyl - $\alpha$-cyanoacrylate, and the mixture thus obtained is dissolved homogeneously, whereby a solution having a viscosity of 3 cps is obtained.

The resulting product has a setting time of 60 – 120 sec. in the case of mild steel and of 30 – 60 sec. in the case of brass.

The adhesive strength of the product is 210 kg/cm² in the case of mild steel, and the heat-resistance of the product is excellent as shown in the later table.

EXAMPLE 5

Similarly as in the case of Example 1, 3 parts of trimethylolpropane trimethacrylate, 4 parts of bis (methacryloxychloropropyl)-phenylvinyl phosphonate, and one part of polymethyl methacrylate solution are added to 92 parts of ethyl-α-cyanoacrylate, and the mixture thus obtained is dissolved homogeneously whereby a solution having a viscosity of 3 cps is obtained.

The resulting product has a setting time of 60 – 120 sec. in the case of mild steel and of 30 – 60 sec. in the case of brass. The adhesive strength of the product is 220 kg/cm² in the case of mild steel, and the heat-resistance of the product is excellent as shown in the later table.

EXAMPLE 6

Similarly as in the case of the example 1, 6 parts of the methacrylic ester of tris (methacryloxyethyl) cyanurate and one part of polymethylmethacrylate, and the mixture thus obtained is dissolved homogeneously, whereby a solution having a viscosity of 4 cps is obtained.

The resulting product has a setting time of 60– 120 sec. in the case of mild steel and of 30 – 60 sec. in the case of brass.

The adhesive strength of the product is 218 kg/cm² in the case of mild steel, and the heat-resistance of the product is excellent as shown in the later table.

EXAMPLE 7

Similarly as in the case of the example 1, 5 parts of tris (methacryloxyethyl) cyanurate and 2.5 parts of bis (dimethacryloxyglyceryl)-β-phenylvinyl phosphonate are added to 92.5 parts of ethyl-α-cyano-acrylate, and the mixture thus obtained is dissolved homogeneously, whereby a solution having a visosity of 3 cps is obtained. The resulting product has a setting time of 60 – 90 sec. in the case of mild steel and of 30 – 45 sec. in the case of brass.

The adhesive strength of the product is 230 kg/cm² in the case of mild steel, and the heat-resistance of the product is excellent as shown in the later table.

The strength (heat resistance) of each sample bonded with each of the products obtained by the above Examples 1 – 7, inclusive, after heat treatment is shown in the following table.

As is apparent from the following table, the heat resistant adhesives of the present invention are excellent in their strength after heat treatment as compared with those of commercial products of similar kind.

MEASURING CONDITION

Mild steel pieces (100 × 20 × 20 mm) are lapped and bonded with adhesive according to the present invention and then subjected to curing for 24 hours at room temperature. This cured product was heated at 150° C for 60 minutes in a heating furnace and then cooled to room temperature, and tensile shear strengths thereof were measured.

| Specimen | Strength after heat treatment | |
|---|---|---|
| Commercial Product A | 0–5 kg/cm² | A part was stripped off during heat treatment |
| Commercial Product B | 17 " | |
| Example 1 | 110 " | |
| " 2 | 135 " | |
| " 3 | 125 " | |
| " 4 | 75 " | |
| " 5 | 80 " | |
| " 6 | 95 " | |
| " 7 | 100 " | |

Where:
A      Eastman 910
B      Visca 18M

COMPOSITION

Eastman 910

Methyl— α — Cyanoacrylate or
Ethyl Methyl— α — Cyanoacrylate added with the following plasticizer below 10 percent.
Dibutyl sebacate
Diethyl adipate
Triphenyl phosphate

Visca 18M butyl - α - Cyanoacrylate added with plasticizer below 10 percent, using the plasticizer as mentioned above.

What is claimed is:

1. An adhesive composition having high heat resistance after curing which consists essentially of an α-cyanoacrylate selected from the group consisting of methyl-α-cyanoacrylate and ethyl-α-cyanoacrylate and 0.5 to 20 percent by weight of at least one ester selected from the group consisting of 1. an ester having the general formula

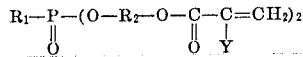

where $R_1$ is an aliphatic or aromatic hydrocarbon group; $R_2$ is an unsubstituted alkylene group having two to eight carbon atoms, or a substituted alkylene group having two to eight carbon atoms and as substituents, halogen, fatty acid carboxylate, acrylate or methacrylate group; and Y is hydrogen, methyl or halogen; and 2. an ester having the general formula

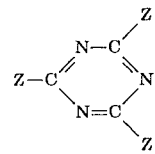

where Z is

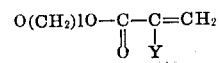

, wherein $l$ is an integer having a value of at least 2, or

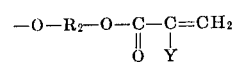

wherein $R_2$ and Y have the same meanings as given under (1).

* * * * *